United States Patent
Aurongzeb

(10) Patent No.: US 12,197,948 B2
(45) Date of Patent: Jan. 14, 2025

(54) SUSTAINABILITY AND EFFICIENCY AS A SERVICE

(71) Applicant: Dell Products L.P., Round Rock, TX (US)

(72) Inventor: Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 901 days.

(21) Appl. No.: 17/192,095

(22) Filed: Mar. 4, 2021

(65) Prior Publication Data

US 2022/0283856 A1 Sep. 8, 2022

(51) Int. Cl.
*G06F 9/48* (2006.01)
*G06F 9/455* (2018.01)
*G06F 9/50* (2006.01)

(52) U.S. Cl.
CPC ........ *G06F 9/4893* (2013.01); *G06F 9/45558* (2013.01); *G06F 9/5094* (2013.01); *G06F 2009/4557* (2013.01)

(58) Field of Classification Search
CPC .. G06F 9/4893; G06F 9/45558; G06F 9/5094; G06F 2009/4557
See application file for complete search history.

(56) References Cited

U.S. PATENT DOCUMENTS

| | | | |
|---|---|---|---|
| 2003/0217090 A1* | 11/2003 | Chauvel | G06F 9/4881 718/102 |
| 2013/0247044 A1* | 9/2013 | Bingham | G06F 9/45533 718/1 |
| 2014/0006534 A1* | 1/2014 | Jain | G06F 1/206 709/208 |
| 2017/0060633 A1* | 3/2017 | Suarez Gracia | G06F 11/3433 |
| 2017/0147399 A1* | 5/2017 | Cropper | G06F 9/45533 |
| 2017/0262317 A1* | 9/2017 | Wong | G06F 9/5094 |

(Continued)

OTHER PUBLICATIONS

J. Flinn and M. Satyanarayanan. "Energy-aware adaptation for mobile applications." ACM SIGOPS Operating Systems Review, vol. 34, No. 2, pp. 13-14, 2000.

(Continued)

*Primary Examiner* — Lewis A Bullock, Jr.
*Assistant Examiner* — Kevin X Lu
(74) *Attorney, Agent, or Firm* — McDermott Will & Emery LLP

(57) ABSTRACT

Minimizing an energy use of virtual machines at one or more information handling systems, including receiving a plurality of computing tasks, each task associated with an energy efficiency indicator; positioning each of the tasks within a task queue indicating an order of execution of the tasks based on the energy efficiency indicator for each task; identifying a plurality of virtual machines, each virtual machine associated with a thermal efficiency indicator based on a historical energy usage of the virtual machine; sorting the virtual machines to identify a distribution of the virtual machines based on the thermal efficiency indicator of the respective virtual machines; allocating the virtual machines to execute the tasks based on i) the distribution of the virtual machines and ii) the task queue; and executing the tasks by the virtual machines based on the allocation.

7 Claims, 3 Drawing Sheets

(56) References Cited

U.S. PATENT DOCUMENTS

2019/0116128 A1* 4/2019 Guo .................. H04L 67/1021

OTHER PUBLICATIONS

J. Aguilar-Saborit, P. Trancoso, V. Muntes-Mulero and J.L. Larriba-Pey. "Dynamic adaptive data structures for monitoring data streams." Data & Knowledge Engineering, ScienceDirect, vol. 66, pp. 92-115, Mar. 2008.

Shehabi, S. J. Smith, E. Masanet, J. Koomey, Environ. Res. Lett. 13, 124030 (2018). 12. IEA, "Tracking clean energy progress" (IEA, 2019); www.iea.org/tcep/.

QTS, "Green Data Centers—Scaling environmental sustainability for business and consumers collectively." https://www.networkworld.com/article/3569189/green-data-centers-scaling-environmental-sustainability-for-business-and-consumers-collectively.html, Jul. 30, 2020.

* cited by examiner

SUSTAINABILITY AND EFFICIENCY AS A SERVICE

FIELD OF THE DISCLOSURE

The disclosure relates generally to an information handling system, and in particular, minimizing energy use of virtual machines at information handling systems.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Worldwide, it's estimated that data centers (server clusters) consume about three percent of the global electric supply and account for about two percent of total greenhouse gas emissions. Increasing the sustainability of such data centers is of great attention.

SUMMARY

Innovative aspects of the subject matter described in this specification may be embodied in a method of minimizing an energy use of virtual machines at one or more information handling systems, including receiving a plurality of computing tasks, each task associated with an energy efficiency indicator; positioning each of the tasks within a task queue indicating an order of execution of the tasks based on the energy efficiency indicator for each task; identifying a plurality of virtual machines, each virtual machine associated with a thermal efficiency indicator based on a historical energy usage of the virtual machine; sorting the virtual machines to identify a distribution of the virtual machines based on the thermal efficiency indicator of the respective virtual machines; allocating the virtual machines to execute the tasks based on i) the distribution of the virtual machines and ii) the task queue; and executing the tasks by the virtual machines based on the allocation.

Other embodiments of these aspects include corresponding systems, apparatus, and computer programs, configured to perform the actions of the methods, encoded on computer storage devices.

These and other embodiments may each optionally include one or more of the following features. For instance, calculating a sustainability performance index (SPI) based on the energy efficiency indicator for each task and the thermal efficiency indicator for each virtual machine; and scheduling execution of the tasks by the virtual machines based on the SPI. Executing the tasks further includes selecting a particular task at a top of the task queue; identifying a particular virtual machine based on the distribution of the virtual machines; and executing the particular task based on the scheduled execution. Identifying a context associated with the virtual machines and/or the tasks; calculating a sustainability performance index (SPI) based on the energy efficiency indicator for each task, the thermal efficiency indicator for each virtual machine, and the context associated with the virtual machines and/or the tasks; and scheduling execution of the tasks by the virtual machines based on the SPI. The context includes a time of day. Positioning each of the tasks within the task queue further comprises positioning each of the tasks within the task queue such that tasks having higher energy efficiency indicators are positioned higher in the task queue. The distribution of the virtual machines includes a decreasing stack of the virtual machines such that a least energy-consuming virtual machine is at a bottom of the stack. Executing the tasks further includes selecting a particular task at a top of the task queue; identifying a particular virtual machine based on the distribution of the virtual machines; and executing the particular task. The virtual machines further comprises allocating the virtual machines to one or more information handling systems.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
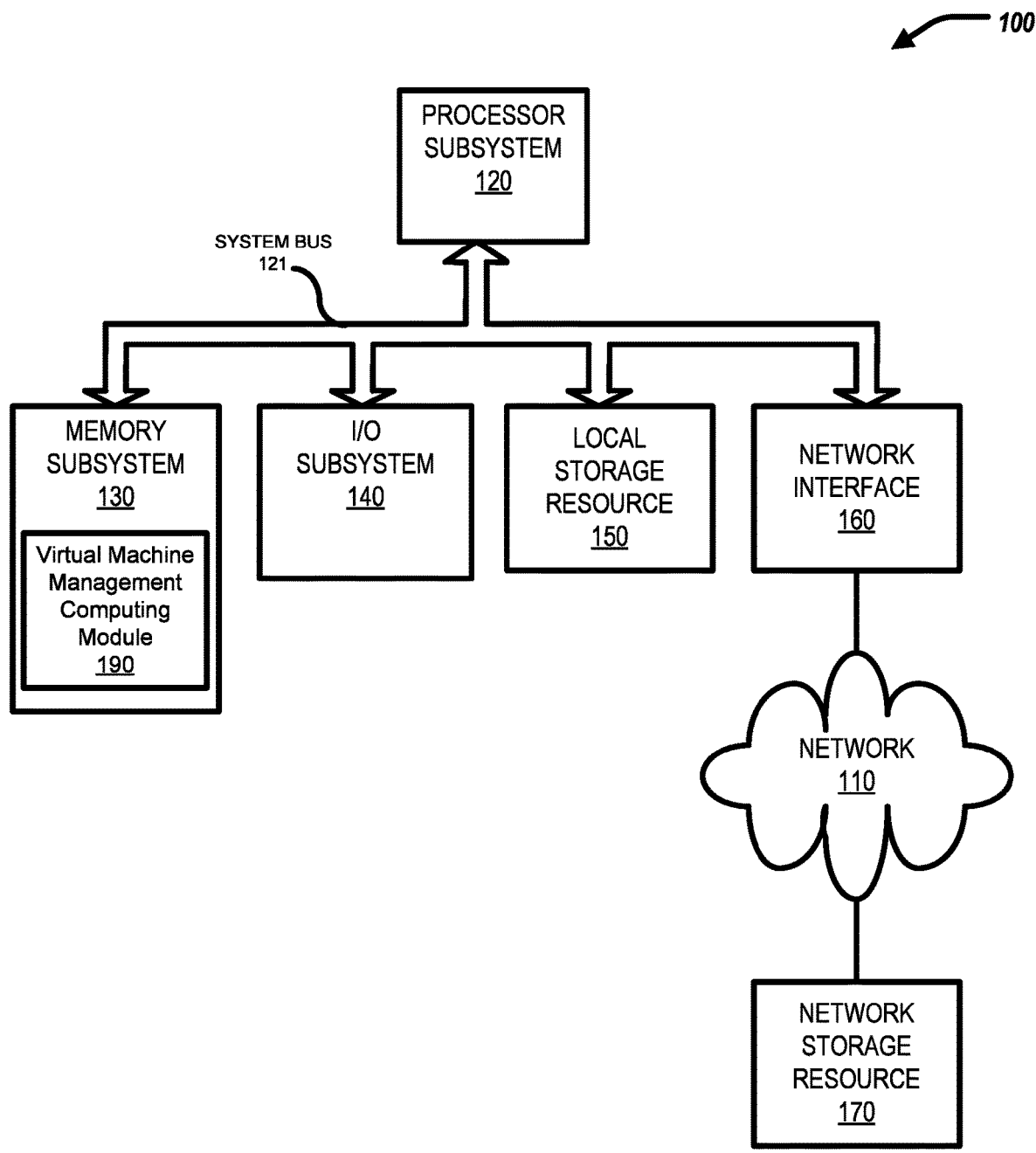
FIG. 1 is a block diagram of selected elements of an embodiment of an information handling system.

This disclosure discusses methods and systems for minimizing energy use of virtual machines employed at information handling systems. Specifically, a virtual machine (VM) management computing module can identify an energy efficiency indicator of computing tasks, a thermal efficiency indicator of the virtual machines, and a context (such as a time/day); and allocate virtual machines to the information handling systems based on such. As a result, sustainability of resources (such as power usage of the information handling systems) can be increased.

Specifically, this disclosure discusses a system and a method for receiving a plurality of computing tasks, each task associated with an energy efficiency indicator; positioning each of the tasks within a task queue indicating an order of execution of the tasks based on the energy efficiency indicator for each task; identifying a plurality of virtual machines, each virtual machine associated with a thermal efficiency indicator based on a historical energy usage of the virtual machine; sorting the virtual machines to identify a distribution of the virtual machines based on the thermal efficiency indicator of the respective virtual machines; allocating the virtual machines to execute the tasks based on i) the distribution of the virtual machines and ii) the task queue; and executing the tasks by the virtual machines based on the allocation.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
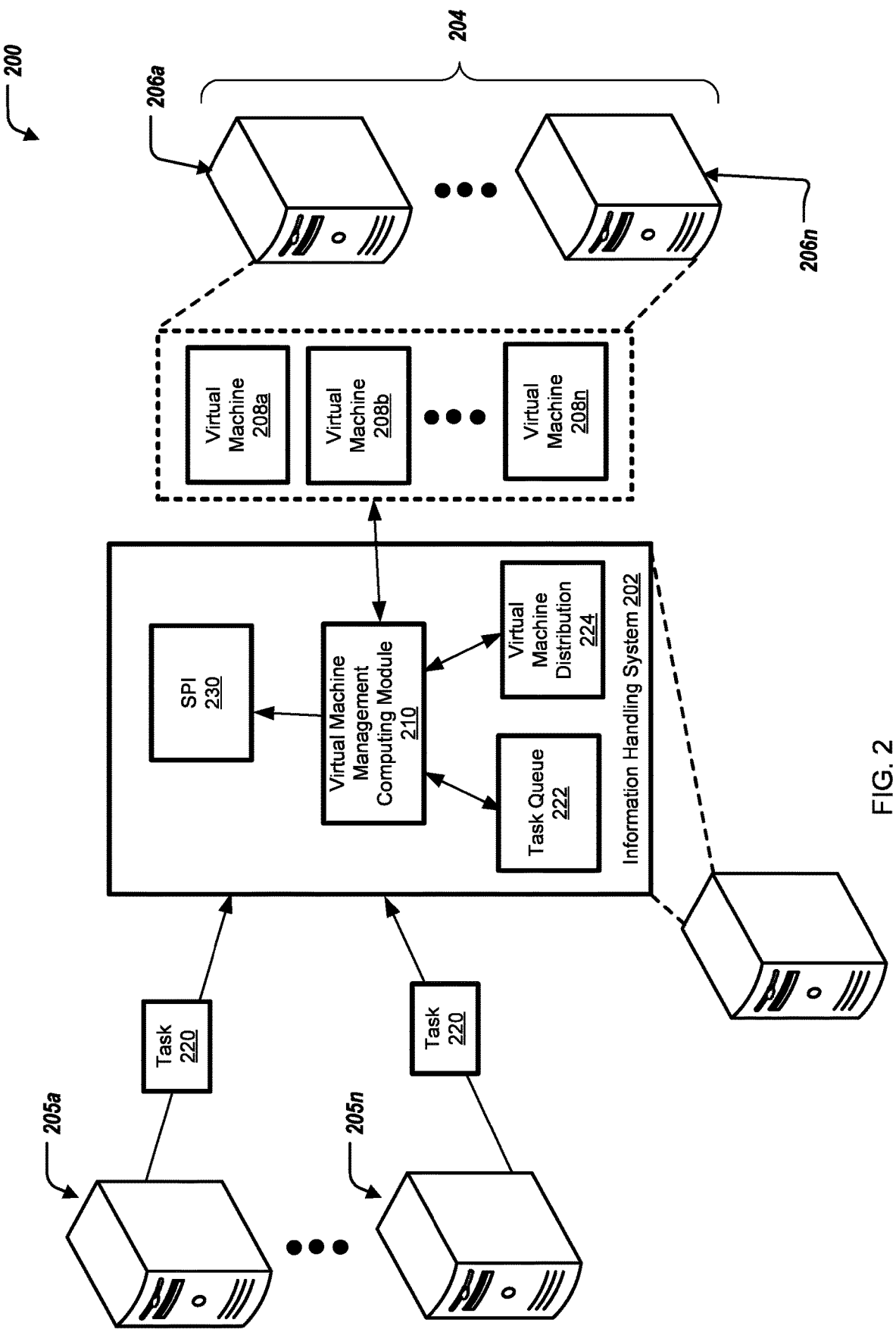
FIG. 2 illustrates a block diagram of an information handling system for minimizing energy use of virtual machines at information handling systems.
Figure 3:
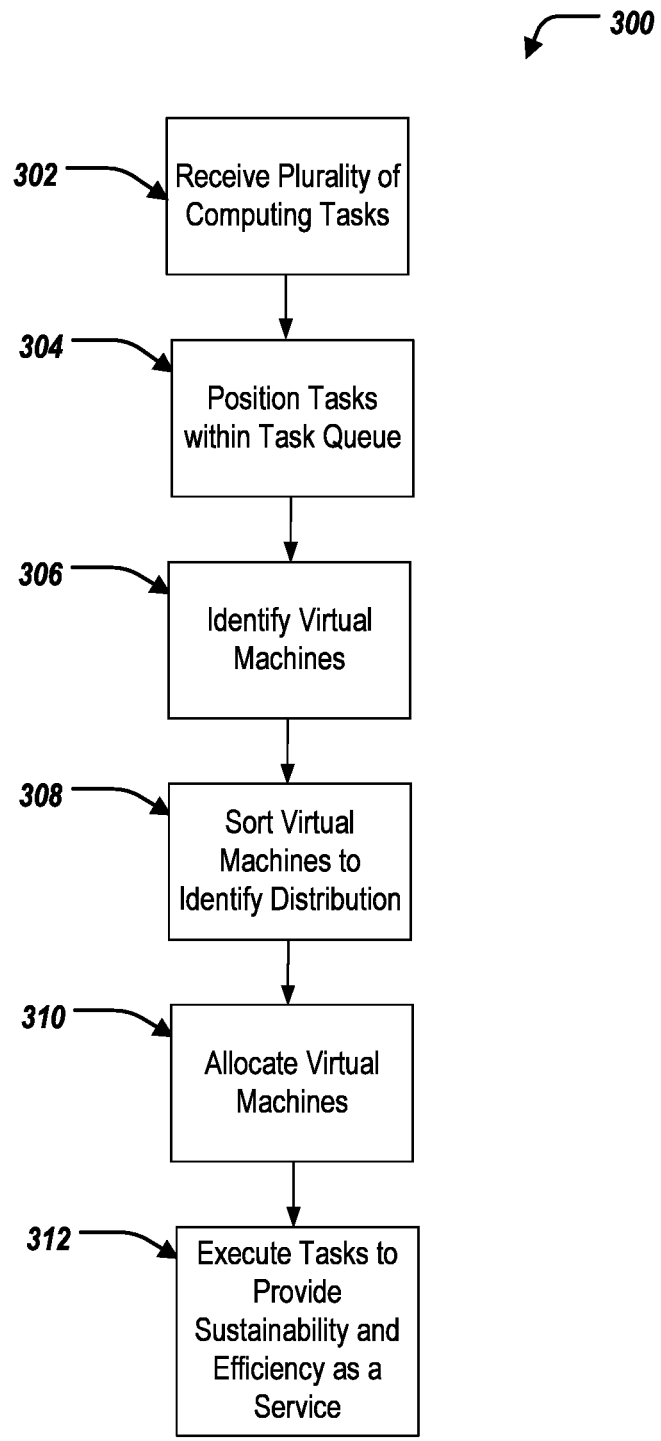
FIG. 3 illustrates a method for sustainability and efficiency as a service.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a virtual machine (VM) management computing module 190. The VM management computing module 190 can be included by the memory subsystem 130. The VM management computing module 190 can include a computer-executable program (software). The VM management computing module 190 can be executed by the processor subsystem 120.

In short, the VM management computing module 190 can minimize energy use of virtual machines employed at information handling systems. Specifically, the VM management computing module 190 can identify an energy efficiency indicator of computing tasks, a thermal efficiency indicator of the virtual machines, and a context (such as a time/day) and allocate virtual machines to the information handling systems based on such. As a result, sustainability of resources (such as power usage of the information handling systems) can be increased.

Turning to FIG. 2, FIG. 2 illustrates an environment 200 including an information handling system 202, a server cluster 204, and client information handling systems 205a, . . . , 205n (collectively referred to as client information handling systems 205). The information handling system 202 can include a virtual machine (VM) management computing module 210. In some examples, the information handling system 202 is similar to, or includes, the information handling system 100 of FIG. 1. In some examples, the VM management computing module 210 is the same, or substantially the same, as the VM management computing module 190 of FIG. 1.

The server cluster 204 can include a plurality of information handling systems 206a, . . . , 206n (collectively referred to as information handling systems 206). The information handling system 206 can implement a plurality of virtual machines (VMs) 208a, 208b, . . . , 208n (collectively referred to as virtual machines 208). The information handling systems 206 can allocate the virtual machines VM 208. In some examples, the information handling systems 206 can allocate a VM 208 across two or more of the information handling systems 206. In some examples, the information handling systems 206 can allocate two or more of the VMs 208 across a single information handling system 206. In some examples, the information handling systems 206 can allocate a plurality of the VMs 208 across two or more of the information handling systems 206. In some examples, the information handling system 202 is included by the server cluster 204.

The client information handling systems 205 can be in communication with the information handling system 202, the server cluster 204, or both, over one or more networks (e.g., the Internet).

In some examples, the client information handling system 205a can provide a computing task 220a (computational-based task 220a) to the information handling system 202, and in particular, the VM management computing module 210 (e.g., over a network); and the client information handling system 205b can provide a computing task 220b (computational-based task 220b) to the information handling system 202, and in particular, the VM management computing module 210. The computing tasks 220a, 220b can collectively be referred to as computing tasks 220.

The VM management computing module 210 can receive (or identify) the computing tasks 220. The tasks 220 are to be executed by the server cluster 204, and in particular, by one or more of the VMs 208. Each of the tasks 220 can be associated with an energy efficiency indicator. The energy efficiency indicator can indicate, for a respective task 220, an environmental impact of performing the task 220 in terms of energy usage. The energy efficiency of a task 220 can indicate a desired power usage (e.g., of the server cluster 204) to complete the task 220 to minimize the energy usage in executing the task 220 and minimize an environmental impact in executing the task 220 (in contrast to a speed efficiency of performing the task 220 for completion of the task 220 as soon as possible without regard to energy usage). The energy efficiency indicator can have values between 0 and 1, with a higher number indicating a higher energy efficiency (or energy sustainability, or data efficacy) of the task 220 as provided by the client information handling system 205. For example, the client information handling system 205a can provide for the task 220a an energy efficiency indicator that indicates a desired energy efficiency of the task 220a; and the client information handling system 205n can provide for the task 220n an energy efficiency indicator that indicates a desired energy efficiency of the task 220n.

The VM management computing module 210 can position each of the tasks 220 within a task queue 222. The task queue 222 can indicate an order of execution of the tasks 220 based on the energy efficiency indicator for each task 220. Specifically, the VM management computing module 210 can position the tasks 220 within the task queue 222 such that tasks 220 having a higher energy efficiency indicator (higher energy sustainability) are positioned higher in the task queue 222. For example, the task 220a is associated with an energy efficiency indicator having a first magnitude; and the task 220n is associated with an energy efficiency indicator having a second magnitude, with the first magnitude greater than the second magnitude. As a result, the VM management computing module 210 can position the task 220a higher in the task queue 222 as compared to the task 220n. That is, the task 220a is more energy efficient (energy sustainable) as compared to task 220n.

The VM management computing module 210 can identify the virtual machines 208. Each of the virtual machines 208 can be associated with a thermal efficiency indicator. The thermal efficiency indicator can be based on a historical energy usage and performance associated with the respective virtual machine 208. That is, the thermal efficiency indicator indicates for the respective virtual machine 208 an energy consumption of the virtual machine 208. The energy consumption of the virtual machine 208 can be based on historical usage of the virtual machine 208, an instantaneous energy consumption of the virtual machine 208, or a combination of both. The thermal efficiency indicator can be associated with a frequency (processing speed) and a voltage (power usage) at the respective virtual machine 208. In some examples, the thermal efficiency indicator can further be based on a temperature associated with the underlying information handling systems 206. That is, each of the information handling systems 206 can be associated with a temperature profile that indicates the temperature of the respective information handling system 206 at various times and days. Thus, a higher a temperature of the underlying information handling system 206 (or information handling systems 206) of a virtual machine 208, the higher the thermal efficiency indicator can be.

The VM management computing module 210 can sort the virtual machines 208 to identify a distribution 224 of the virtual machines 208 based on the thermal efficiency indicator of the respective virtual machines 208. Specifically, the VM management computing module 210 can generate the distribution 224 of the virtual machines 208 such that the distribution 224 includes a decreasing stack of the virtual machines 208 based on the thermal efficiency indicator. The distribution 224 of the virtual machines 208 can include a decreasing stack of the virtual machines 208 such that a least energy-consuming virtual machine 208 is at a bottom of the stack (and the virtual machine 208 that consumes the most energy is at a top of the stack). In other words, the distribution 224 of the virtual machines 208 can be considered a list of dormant virtual machines 208. The thermal efficiency indicator can have values between 0 and 1, with a higher number indicating a higher thermal efficiency (or thermal efficacy) of the virtual machine 208. For example, the virtual machine 208a is associated with a thermal efficiency indicator having a first magnitude; and the virtual machine 208b is associated with an thermal efficiency indicator having a second magnitude, with the first magnitude greater than the second magnitude. As a result, the VM management computing module 210 can generate the distribution 224 such that the virtual machine 208a is positioned higher in the stack as compare to the virtual machine 208n. That is, the virtual machine 208a consumes more energy (greater processing capability) as compared to virtual machine 208n.

The VM management computing module 210 can allocate the virtual machines 208 to execute the tasks 220 based on i) the distribution 224 of the virtual machines 208 and ii) the task queue 222. Specifically, the VM management computing module 210 can provide instructions to the information handling systems 206 indicating the allocation of the virtual machines 208. The information handling systems 206 can allocate the virtual machines 208 as appropriate among the information handling systems 206 and based on the instructions (the instructions based on the distribution 224 and the task queue 222). The virtual machines 208 can execute the tasks 220 based on the allocation.

In some examples, the VM management computing module 210 can calculate a sustainability performance index (SPI) 230. Specifically, the VM management computing module 210 can calculate the SPI 230 based on the energy efficiency indicator for each task 220 and the thermal efficiency indicator for each virtual machine 208. The VM management computing module 210 can schedule execution of the tasks 220 by the virtual machines 208 based on the SPI 230. That is, the VM management computing model 210 can model execution of the tasks 220 based on the SPI 230. For example, an energy efficiency indicator for the task 220a is 0.7, the energy efficiency indicator for the task 220n is 0.5, the thermal efficiency indicator for the virtual machine 208a is 0.9 and the thermal efficiency indicator for the virtual machine 208n is 0.2. For example, the SPI 230 (or the SPI efficiency 230) for the task 220a and the virtual machine 220a is (0.7+0.9)/2=0.8; the SPI 230 for the task 220a and the virtual machine 208n is (0.7+0.2)/2=0.45; the SPI 230 for the task 220n and the virtual machine 220a is (0.5+0.9)/2=0.7; and the SPI 230 for the task 220n and the virtual machine 208n is (0.5+0.2)/2=0.35. Thus, the greatest SPI 230 is achieved when the task 220a is executed by the virtual machine 220a (SPI of 0.8) and the task 220n is executed by the virtual machine 208n (SPI of 0.35). Thus, the VM management computing module 210 can schedule execution of the tasks 220 by the virtual machines 208 accordingly. In some examples, the SPI 230 can prioritize the thermal efficiency indicator for the virtual machines 208 followed by the energy efficiency indicator for the tasks 220.

In some examples, the VM management computing module 210 can identify a context associated with the virtual machines 208 and/or the tasks 220. In some examples, the context can include a current time of day and/or a current day. In some examples, the context can include a day/time associated with a desired execution of the tasks 220. In some examples, the thermal efficiency indicator for each virtual machine 208 is based on the context—and specifically, the date and time. For example, the thermal efficiency indicator can be based on a historical energy usage and computational performance associated with the respective virtual machine 208, and with respect to the data and time of such historical energy usage and computational performance. That is, the thermal efficiency indicator can change for the current date/time and based on the historical usage and performance for such date/time (or similar date/time range). The context can have values between 0 and 1, with a higher number indicating a higher energy cost. For example, for a time of day of 4 μm, the context can have a value of 0.8; and for a time of day of 8 μm, the context can have a value of 0.2.

In some examples, the VM management computing module 210 can calculate the SPI 230 based on the energy efficiency indicator for each task 220, the thermal efficiency indicator for each virtual machine 208, and the context associated with the tasks 220 and/or the virtual machines 208. The VM management computing module 210 can schedule execution of the tasks 220 by the virtual machines 208 based on the SPI 230. That is, the VM management computing model 210 can model execution of the tasks 220 based on the SPI 230. For example, an energy efficiency indicator for the task 220a is 0.7, the energy efficiency indicator for the task 220n is 0.5, the thermal efficiency indicator for the virtual machine 208a is 0.9, the thermal efficiency indicator for the virtual machine 208n is 0.2, and a context is 0.8. For example, the SPI 230 (or the SPI efficiency 230) for the task 220a and the virtual machine 220a is (0.7+0.9+0.8)/3=0.8; the SPI 230 for the task 220a and the virtual machine 208n is (0.7+0.2+0.8)/3=0.56; the SPI 230 for the task 220n and the virtual machine 208a is (0.5+0.9+0.8)/3=0.73; and the SPI 230 for the task 220n and the virtual machine 208n is (0.5+0.2+0.8)/3=0.5. Thus, the greatest SPI 230 is achieved when the task 220a is executed by the virtual machine 208a (SPI of 0.8) and the task 220n is executed by the virtual machine 208n (SPI of 0.35). Thus, the VM management computing module 210 can schedule execution of the tasks 220 by the virtual machines 208 accordingly.

In some examples, the VM management computing module 210, when executing the tasks 220, can select a particular task 220 at a top of the task queue 222. Continuing the example, the VM management computing module 210 can select the task 220a from the top of the task queue 222. The VM management computing module 210 can identify a particular virtual machine 208 based on the distribution 224 of the virtual machines 208. For example, the VM management computing module 210 can identify the virtual machine 208a based on the distribution 224. The virtual machine 208a can execute the task 220a based on the scheduled execution. For example, the virtual machine 208 can execute the task 220a based on the scheduled execution that is based on the SPI 230 for the tasks 220 and the virtual machines 208.

In some examples, the VM management computing module 210 can generate the distribution 224 of the virtual machines 208 such that a virtual machine 208 associated with an idle information handling system 206 (an information handling system 206 not currently executing a task 220) at a top of the stack. The remaining distribution 224 of the virtual machines 208 can include a decreasing stack of the virtual machines 208 such that a least energy-consuming virtual machine 208 is at a bottom of the stack.

FIG. 3 illustrates a flowchart depicting selected elements of an embodiment of a method 300 for sustainability and efficiency as a service. The method 300 may be performed by the information handling system 100, the information handling system 202 and/or the virtual machine management computing module 210, and with reference to FIGS. 1-2. It is noted that certain operations described in method 300 may be optional or may be rearranged in different embodiments The VM management computing module 210 receives a plurality of computing tasks 220 (302). Each task 220 is associated with an energy efficiency indicator. The VM management computing module 210 positions each of the tasks 220 within the task queue 222 (304). The task queue 222 indicates an order of execution of the tasks 220 based on the energy efficiency indicator for each task 220. The VM management computing module 210 positions the tasks 220 within the task queue 222 such that tasks 220 having higher energy efficiency indicators are positioned higher in the task queue. The VM management computing module 210 identifies a plurality of virtual machines 208 (306). Each virtual machine 208 is associated with a thermal efficiency indicator based on a historical energy usage of the virtual machine 208. The VM management computing module 210 sorts the virtual machines 208 to identify a distribution 224 of the virtual machines (308). The VM management computing module 210 sorts the virtual machines 208 based on the thermal efficiency indicator of the respective virtual machines 208. The VM management computing module 210 generates the distribution of the virtual machines 208 to include a decreasing stack of the virtual machines 208 such that a least energy-consuming virtual machine 208 is at a bottom of the stack. The VM management computing module 210 allocates the virtual machines 208 to execute the tasks 220 (310). The virtual machines 208 execute the tasks 220 based on i) the distribution 224 of the virtual machines 208 and ii) the task queue 222. The virtual machines 208 execute the tasks 220 based on the allocation to provide sustainability and efficiency as a service (312).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of minimizing an energy use of virtual machines at one or more information handling systems, the method comprising:
   receiving a plurality of computing tasks, each task associated with an energy efficiency indicator;
   positioning each of the tasks within a task queue indicating an order of execution of the tasks based on the energy efficiency indicator for each task, including positioning each of the tasks within the task queue such that tasks having higher energy efficiency indicators are positioned higher in the task queue, the energy efficiency indicator indicating, for each task, an energy usage required to perform the task by one or more of the virtual machines;
   identifying a plurality of virtual machines of the virtual machines at the one or more information handling systems, each virtual machine associated with a thermal efficiency indicator indicating a historical energy usage of the virtual machine;
   identifying a context associated with the virtual machines and/or the tasks;
   calculating a sustainability performance index (SPI) based on the energy efficiency indicator for each task, the thermal efficiency indicator for each virtual machine, and the context associated with the virtual machines and/or the tasks;
   sorting the virtual machines to identify a distribution of the virtual machines based on the thermal efficiency indicator of the respective virtual machines, wherein the distribution of the virtual machines includes a decreasing stack of the virtual machines such that a least energy-consuming virtual machine is at the bottom of the stack;
   allocating the virtual machines to execute the tasks based on i) the distribution of the virtual machines and ii) the task queue; and
   executing the tasks by the virtual machines based on the allocation, including, for each task of the task queue:
      selecting, based on the task queue, a particular task of the tasks that is positioned at a top of the task queue, the particular task that is selected having a higher energy efficiency indicator than the remaining tasks of the tasks;
      identifying, based on the distribution, a particular virtual machine of the virtual machines that is indicated at a top of the decreasing stack of the virtual machines, the particular virtual machine that is identified being a highest energy-consuming virtual machine of the virtual machines;
      scheduling execution of the tasks by the virtual machines based on the SPI; and
      executing, by the particular virtual machine and based on the SPI, the particular task such that the particular virtual machine having the highest-energy consumption executes the particular task having the highest energy efficiency indicator.

2. The computer-implemented method of claim 1, wherein the context includes a time of day.

3. The computer-implemented method of claim 1, wherein allocating the virtual machines further comprises allocating the virtual machines to one or more information handling systems.

4. An information handling system comprising a processor having access to memory media storing instructions executable by the processor to perform operations comprising, comprising:
   receiving a plurality of computing tasks, each task associated with an energy efficiency indicator;
   positioning each of the tasks within a task queue indicating an order of execution of the tasks based on the energy efficiency indicator for each task, including positioning each of the tasks within the task queue such that tasks having higher energy efficiency indicators are positioned higher in the task queue, the energy efficiency indicator indicating, for each task, an energy usage required to perform the task by one or more of a plurality of virtual machines;
   identifying the plurality of virtual machines, each virtual machine associated with a thermal efficiency indicator indicating a historical energy usage of the virtual machine;
   identifying a context associated with the virtual machines and/or the tasks;
   calculating a sustainability performance index (SPI) based on the energy efficiency indicator for each task, the thermal efficiency indicator for each virtual machine, and the context associated with the virtual machines and/or the tasks;
   sorting the virtual machines to identify a distribution of the virtual machines based on the thermal efficiency indicator of the respective virtual machines, wherein the distribution of the virtual machines includes a decreasing stack of the virtual machines such that a least energy-consuming virtual machine is at the bottom of the stack;
   allocating the virtual machines to execute the tasks based on i) the distribution of the virtual machines and ii) the task queue; and
   executing the tasks by the virtual machines based on the allocation, including, for each task of the task queue:
      selecting, based on the task queue, a particular task of the tasks that is positioned at a top of the task queue, the particular task that is selected having a higher energy efficiency indicator than the remaining tasks of the tasks;
      identifying, based on the distribution, a particular virtual machine of the virtual machines that is indicated at a top of the decreasing stack of the virtual machines, the particular virtual machine that is identified being a highest energy-consuming virtual machine of the virtual machines;
      scheduling execution of the tasks by the virtual machines based on the SPI; and
      executing, by the particular virtual machine and based on the SPI, the particular task such that the particular virtual machine having the highest-energy consumption executes the particular task having the highest energy efficiency indicator.

5. The information handling system of claim 4, wherein the context includes a time of day.

6. The information handling system of claim 4, wherein allocating the virtual machines further comprises allocating the virtual machines to one or more information handling systems.

7. A non-transitory computer-readable medium storing software comprising instructions executable by one or more computers which, upon such execution, cause the one or more computers to perform operations comprising:
   receiving a plurality of computing tasks, each task associated with an energy efficiency indicator;
   positioning each of the tasks within a task queue indicating an order of execution of the tasks based on the energy efficiency indicator for each task, including positioning each of the tasks within the task queue such that tasks having higher energy efficiency indicators are positioned higher in the task queue, the energy efficiency indicator indicating, for each task, an energy usage required to perform the task by one or more of a plurality of virtual machines;

identifying the plurality of virtual machines, each virtual machine associated with a thermal efficiency indicator indicating a historical energy usage of the virtual machine;

identifying a context associated with the virtual machines and/or the tasks;

calculating a sustainability performance index (SPI) based on the energy efficiency indicator for each task, the thermal efficiency indicator for each virtual machine, and the context associated with the virtual machines and/or the tasks;

sorting the virtual machines to identify a distribution of the virtual machines based on the thermal efficiency indicator of the respective virtual machines, wherein the distribution of the virtual machines includes a decreasing stack of the virtual machines such that a least energy-consuming virtual machine is at the bottom of the stack;

allocating the virtual machines to execute the tasks based on i) the distribution of the virtual machines and ii) the task queue; and executing the tasks by the virtual machines based on the allocation, including, for each task of the task queue:

selecting, based on the task queue, a particular task of the tasks that is positioned at a top of the task queue, the particular task that is selected having a higher energy efficiency indicator that the remaining tasks of the tasks;

identifying, based on the distribution, a particular virtual machine of the virtual machines that is indicated at a top of the decreasing stack of the virtual machines, the particular virtual machine that is identified being a highest energy-consuming virtual machine of the virtual machines;

scheduling execution of the tasks by the virtual machines based on the SPI; and executing, by the particular virtual machine and based on the SPI, the particular task such that the particular virtual machine having the highest-energy consumption executes the particular task having the highest energy efficiency indicator.

* * * * *